(12) United States Patent
Wu et al.

(10) Patent No.: US 6,666,586 B2
(45) Date of Patent: Dec. 23, 2003

(54) OPTIC ADAPTOR WITH VARIABLE SIGNAL ATTENUATION

(75) Inventors: Kun-Tsan Wu, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 79 days.

(21) Appl. No.: 10/016,063

(22) Filed: Dec. 6, 2001

(65) Prior Publication Data
US 2003/0091292 A1 May 15, 2003

(30) Foreign Application Priority Data
Nov. 15, 2001 (TW) .......................................... 90219628

(51) Int. Cl.$^7$ ................................................. G02B 6/38

(52) U.S. Cl. ....................................................... 385/70

(58) Field of Search ............................ 385/70, 72, 60, 385/140, 73

(56) References Cited

U.S. PATENT DOCUMENTS

| 4,666,243 A | * | 5/1987 | Rogstadius et al. | ........... 385/73 |
| 5,263,106 A | * | 11/1993 | Rosson | ........................ 385/72 |

* cited by examiner

Primary Examiner—Javaid H. Nasri
(74) Attorney, Agent, or Firm—Wei Te Chung

(57) ABSTRACT

An optic adaptor connects first and second optic fibers in an aligned but spaced fashion for attenuation of optic signal traveling between the optic fibers. The adaptor includes a base secured to a patch panel and connected to the first optic fiber. The base defines a bore receiving and retaining a first end of a sleeve that receives the first optic fiber. A cylinder has a proximal end axially and movably received in the bore to receive a second end of the sleeve. A fiber connection member is mounted to the cylinder and attaches the second optic fiber to the cylinder with the second optic fiber received in the second end of the sleeve. A knob ring threadingly engages the cylinder. The knob is rotatably mounted to but is not axially movable with respect the base body whereby rotation of the knob induces axial movement of the cylinder and the second optic fiber with respect to the base body and the first optic fiber. Thus the distance between the optic fibers can be changed.

2 Claims, 7 Drawing Sheets

OPTIC ADAPTOR WITH VARIABLE SIGNAL ATTENUATION

BACKGROUND OF THE INVENTION

1. Field of the Invention

The present invention generally relates to an optic adaptor and more particular to an optic adaptor incorporating variable attenuator therein.

2. The Related Arts

Optic attenuators are often incorporated in optic communication network for selectively attenuating optic signal to match the requirement of particular systems. Optic attenuators are also used to attenuate optic signal for accessing system loss, simulation and tests.

A number of differently structured optic attenuators are available in the market. One commonly employed method for attenuating optic signal is to offset optic fibers with respect to each other which reduces signal coupling efficiency of the optic fiber and thus attenuating the optic signal passing therethrough. Another method that can be employed to attenuate optic signal is to separate opposing ends of two aligned optic fibers. The larger the distance between the opposing ends of the fiber is, the more attenuation can be achieved.

FIG. 1 of the attached drawings schematically shows the former method. An optic signal travels from a first optic fiber 81 to a second optic fiber 82. The optic fibers 81, 82 are offset a distance d with respect to each other. An example of this method is disclosed in U.S. Pat. No. 5,263,106.

FIG. 2 of the attached drawings schematically shows the later method. An optic signal travels from a first optic fiber 91 to a second optic fiber 92. Ends of the fibers 91, 92 are separated a distance S. The attenuation loss Ls of the optic signal is dependent upon the distance S, as shown in FIG. 3 of the attached drawings. A separation distance of 2.5 mm may cause a loss of 26 dB.

The later method requires only mechanically moving the optic fibers with respect to each in order to adjust attenuation. Thus it can be easily incorporated with an optic adaptor to joint two fibers in line.

FIG. 4 is an example of the later method shown in U.S. Pat. No. 4,666,243 which comprises a guide sleeve 3 for receiving and aligning two optic fibers 1, 2. Two end sleeves 4, 5 are respectively threaded to fibers 1, 2. The end sleeves 4, 5 are threadingly connected to each other for adjusting a distance d between the fibers 1, 2. The end sleeves 4, 5 are secured in position by a nut 6. A disadvantage of the conventional optic adaptor is that the end sleeves 4, 5 are rotated with respect to each other in adjusting the distance d. The rotation of the end sleeves may cause the optic fibers 1, 2 to move or rotate with respect to each other and thus leading to damage to the optic fibers 1, 2. Further, it may not be possible to realize continuous adjustment of the device.

It is thus desirable to provide an optic device for overcoming the above problems.

SUMMARY OF THE INVENTION

Accordingly, an object of the present invention is to provide an optic adaptor incorporating signal attenuator.

Another object of the present invention is to provide an optic adaptor with variable signal attenuation wherein optic fibers are not allowed to rotated with respect to each other in order to reduce the likelihood of damage to the optic fibers.

A further object of the present invention is to provide an optic adaptor incorporating continuous adjustment of attenuation.

To achieve the above objects, in accordance with the present invention, an optic adaptor connects first and second optic fibers in an aligned but spaced fashion for attenuation of optic signals traveling between the optic fibers. The adaptor comprises a base secured to a patch panel and connected to the first optic fiber. The base defines a bore receiving and retaining a first end of a sleeve that receives the first optic fiber. A cylinder has a proximal end axially and movably received in the bore to receive a second end of the sleeve. A fiber connection member is mounted to the cylinder and attaches the second optic fiber to the cylinder with the second optic fiber received in the second end of the sleeve. A knob ring threadingly engages the cylinder. The knob is rotatably mounted to but is not axially movable with respect the base body whereby rotation of the knob induces axial movement of the cylinder and the second optic fiber with respect to the base body and the first optic fiber. Thus the distance between the optic fibers can be changed.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
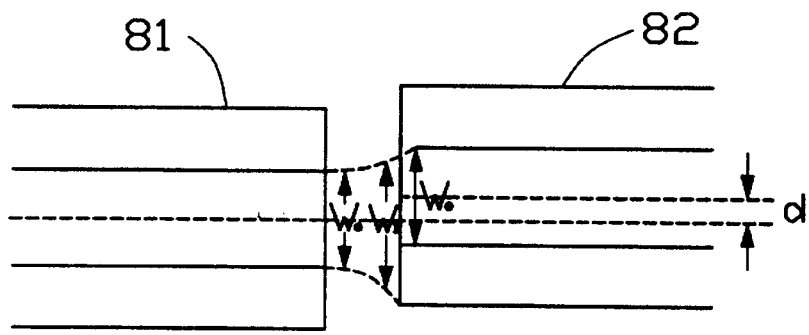
FIG. 1 is a schematic view showing a first conventional way for attenuating optic signal.
Figure 2:
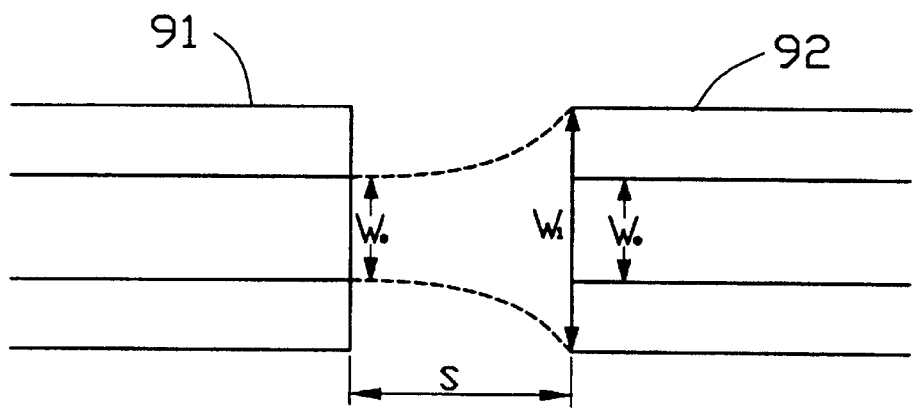
FIG. 2 is a schematic view showing a second conventional way for attenuating optic signal.
Figure 3:
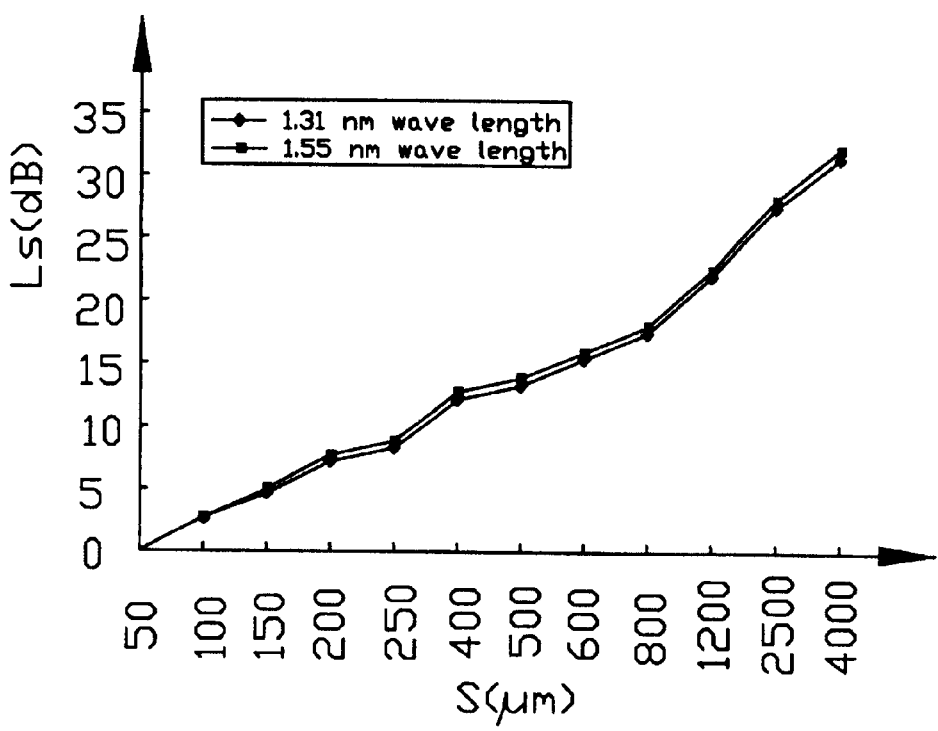
FIG. 3 is a plot of the attenuation loss vs. distance between two aligned optic fibers.
Figure 4:
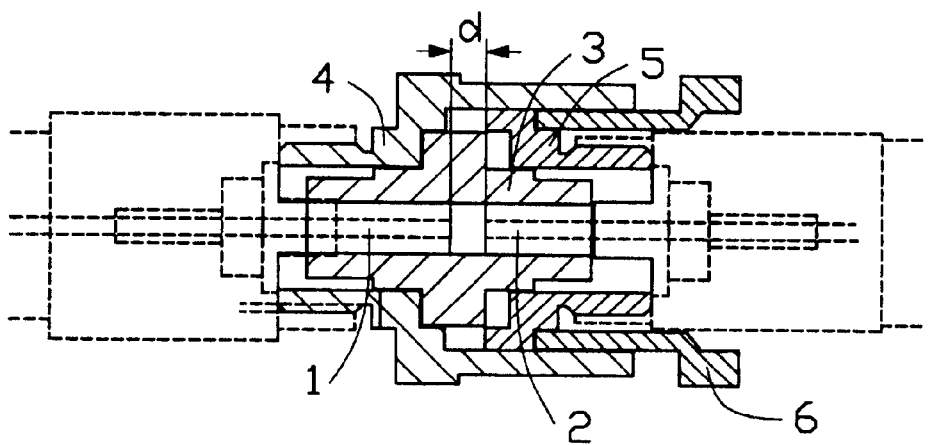
FIG. 4 is a cross-sectional view showing a conventional adaptor type optic attenuator.
Figure 5:
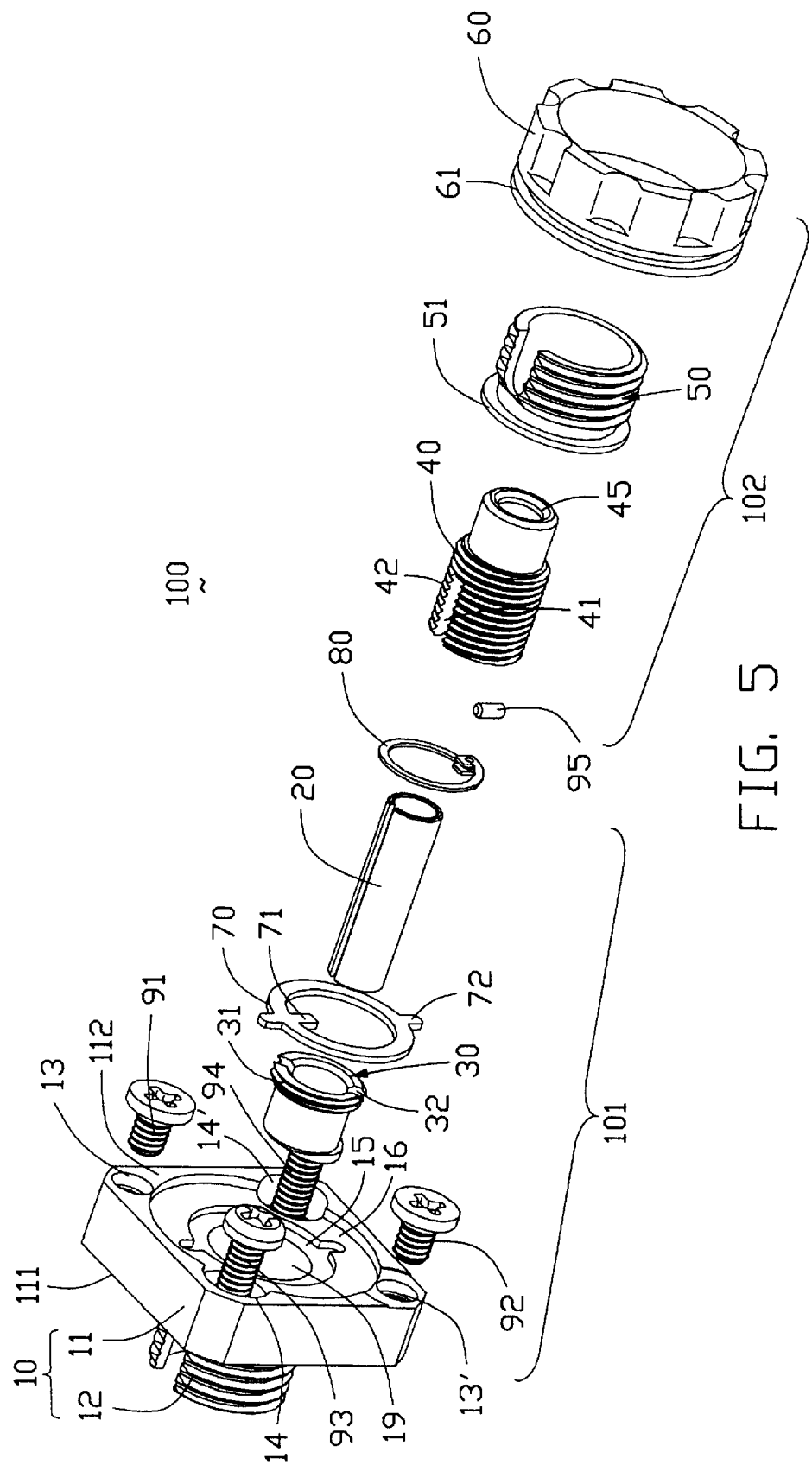
FIG. 5 is an exploded view of an optic adaptor constructed in accordance with the present invention.
Figure 6:
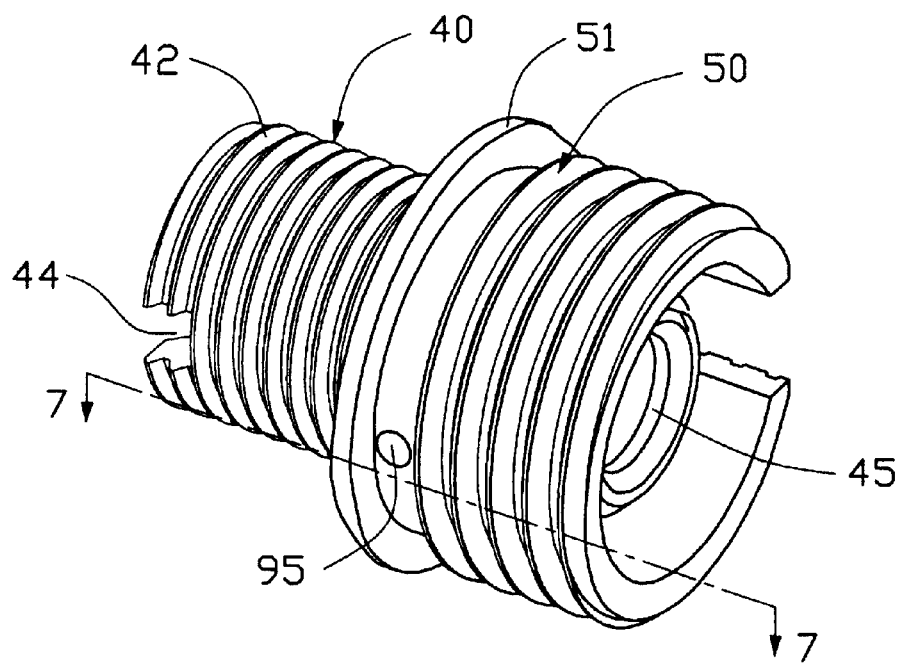
FIG. 6 is a perspective view of a movable cylinder of the optic adaptor of the present invention and a fiber connection member mounted thereto.
Figure 7:
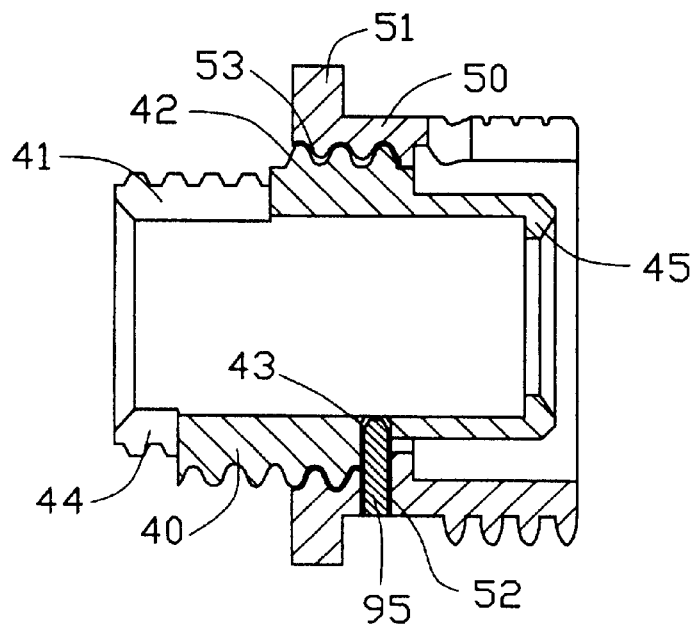
FIG. 7 is a cross-sectional view taken along line 7—7 of FIG. 6.
Figure 8:
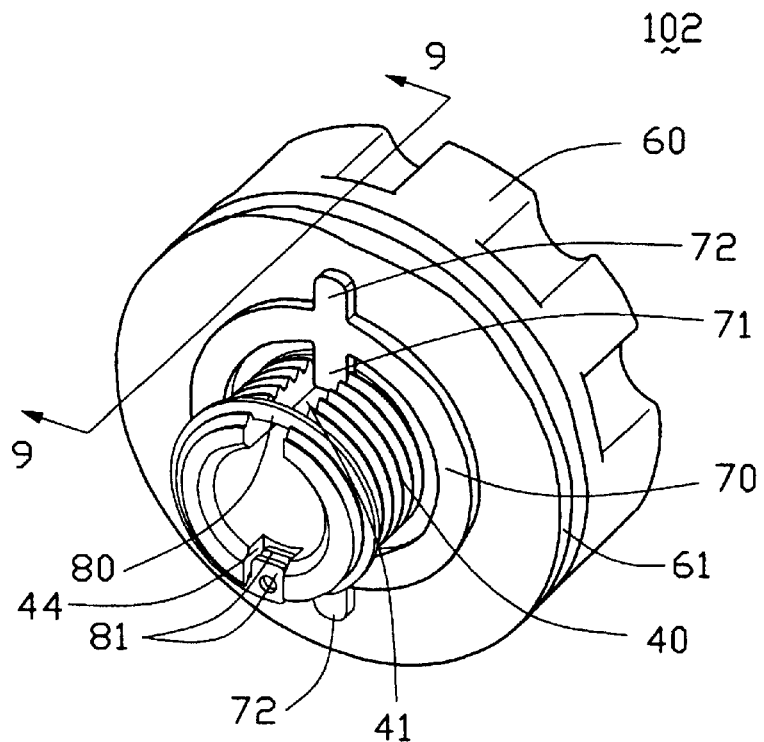
FIG. 8 is a perspective view of a movable portion of the optic adaptor in accordance with the present invention.
Figure 9:
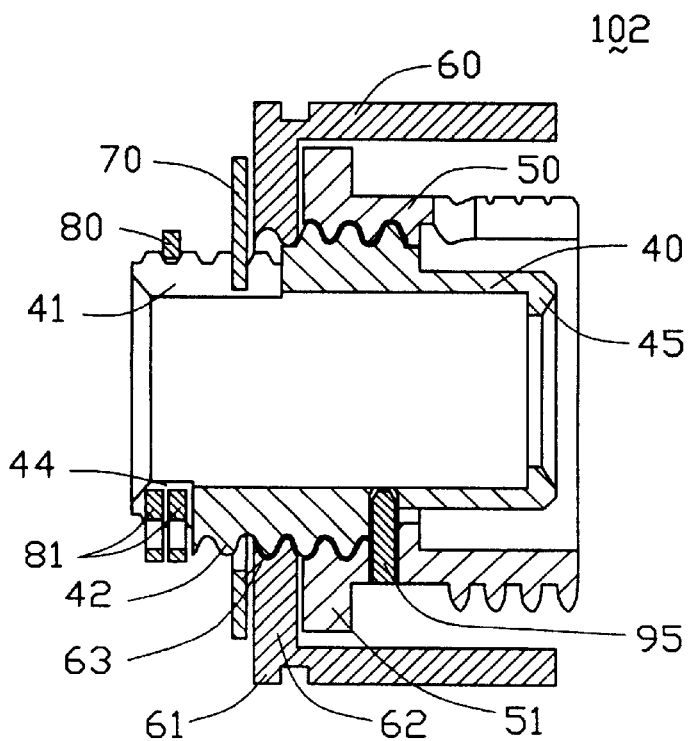
FIG. 9 is a cross-sectional view taken along line 9—9 of FIG. 8.
Figure 12:
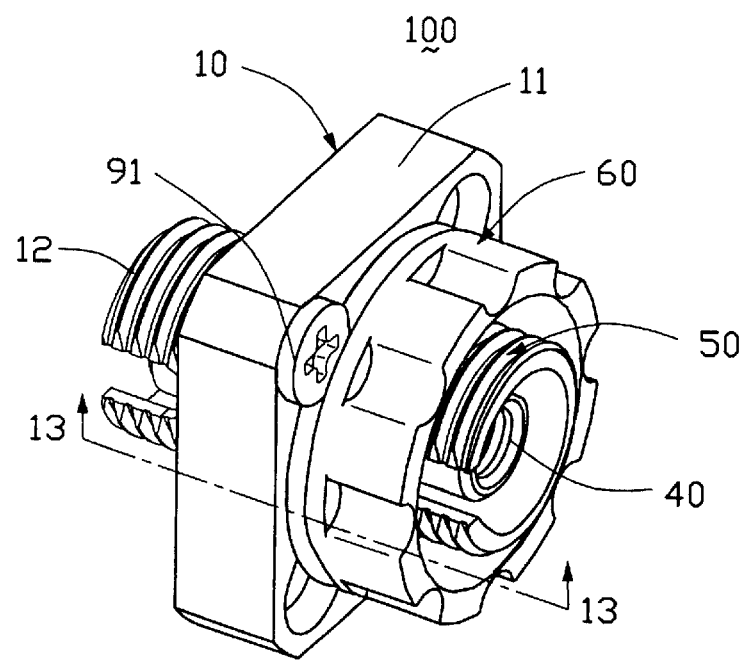
FIG. 12 is a perspective view of the optic adaptor in accordance with the present invention.
Figure 13:
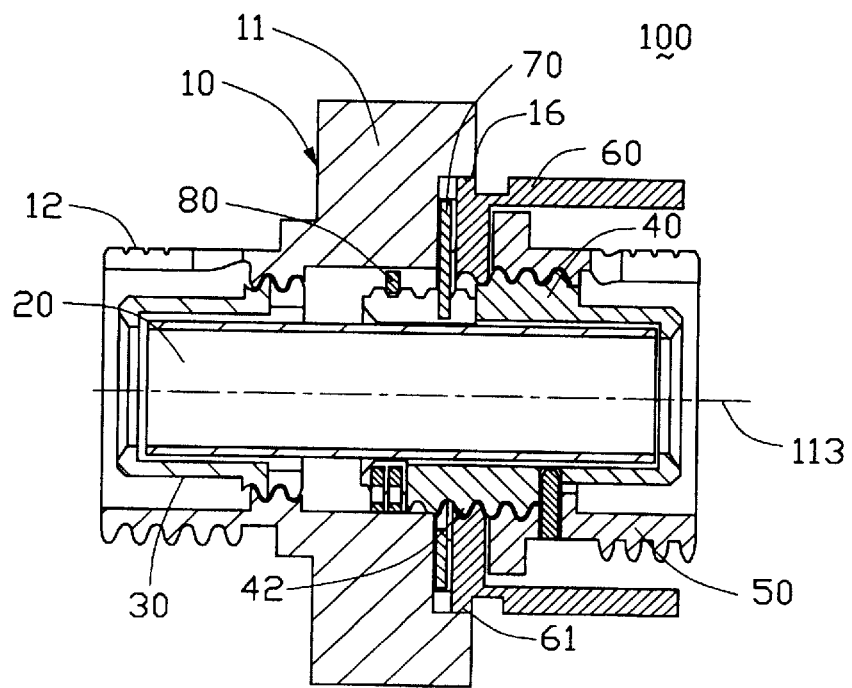
FIG. 13 is a cross-sectional view taken along line 13—13 of FIG. 12.

With reference to the drawings and in particular to FIGS. 5, 12 and 13, an optic adaptor constructed in accordance with the present invention, generally designated with reference numeral 100, comprises a stationary portion 101 to be mounted to a fixture, such as a patch panel (not shown) and a movable portion 102 manually movable with respect to the stationary portion 101 for adjusting attenuation of optic signal passing through the adaptor 100. Both the stationary portion 101 and the movable portion 102 have a threaded connection 12, 50 for connecting an optic fiber (not shown) in such a way that the optic fibers are aligned with each other with a gap formed between the every ends of the fibers.

Figure 10:
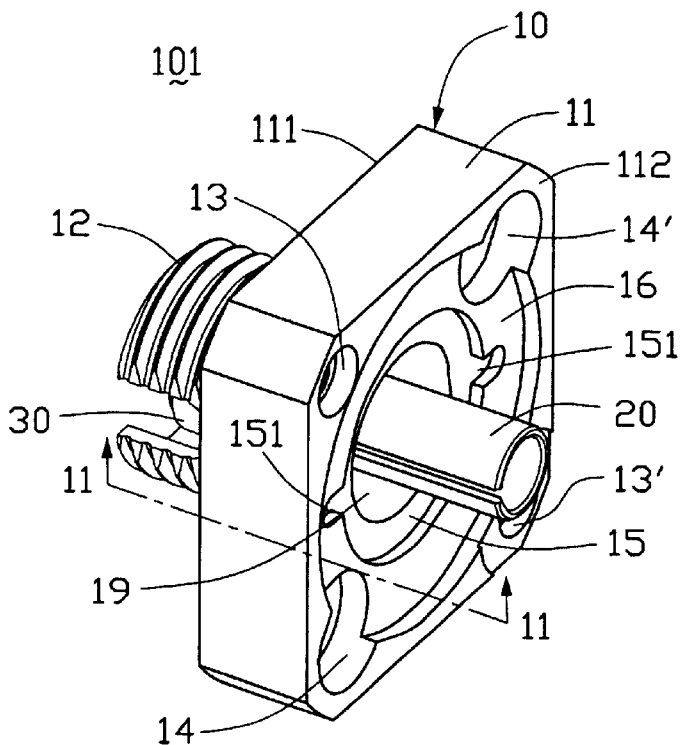
FIG. 10 is a perspective view of a stationary portion of the optic adaptor in accordance with the present invention.
Figure 11:
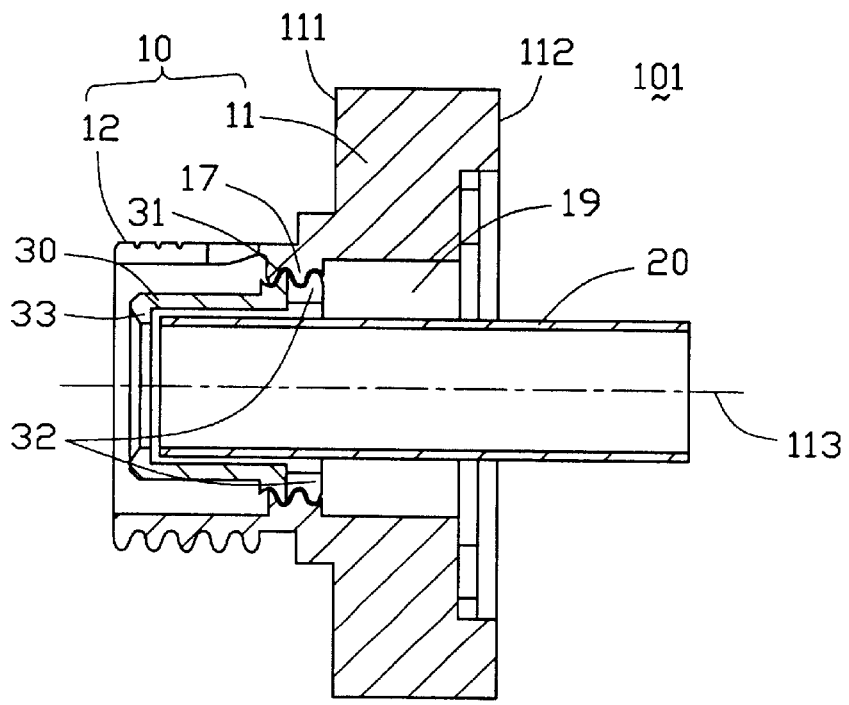
FIG. 11 is a cross-sectional view taken along line 11—11 of FIG. 10.

Also referring to FIGS. 10 and 11, the stationary portion 101 consists of a base 10 comprising a body 11 having opposite first and second surfaces 111, 112 and a first connection member 12 extending from the first surface 111 of the body 11 along a central axis 113 for connection with for example a first FC type optic connector carrying a first optic fiber (both not shown). A central bore 19 is defined in the body 11 and extends along the central axis 113 through the first connection member 12. Holes 14, 14' are defined in the base body 11 for receiving bolts 93, 94 to mount the base 10 of the stationary portion 101 to for example a patch panel (not shown). Additional threaded holes 13, 13' are defined in the base body 11 for threadingly receiving bolts 91, 92. The movable portion 102 is movably attached to the second surface 112 of the body 111 by the bolts 91, 92. This will be further discussed.

A circular recess 16 is defined in the second surface 112 of the base body 11. A circular cavity 15 is defined in a bottom of the circular recess 16. In the embodiment illustrated, the circular recess 16, the circular cavity 15 and the bore 19 are concentric with respect to each other. An retainer ring 30 is received and retained inside the central bore 19. The retainer ring 30 is formed with external threading 31 engages inner threading 17 formed inside the central bore 19 to retain the retainer ring 30 in the central bore 19. Circumferential flange 33 is formed inside the retainer ring 30. Notches 32 are defined in an end of the retainer ring 30 for receiving a tool (not shown) that facilitates engagement of the retainer ring 30 with the base body 11.

Two notches 151 are defined in the bottom of the circular recess 16 of the base body 11 and in communication with the circular cavity 15.

A sleeve 20 has a proximal end fit into the central bore 19 of the body 11 and received and retained by the retainer ring 30.

Also referring to FIGS. 6–9, the movable portion 102 of the adaptor 100 comprises an axially movable cylinder 40 having a proximal end (not labeled) partially and movably received in the central bore 19 of the base body 11 and confronting the retainer ring 30 for receiving a distal end of the sleeve 20. The cylinder 40 forms an inner flange 45 opposite to the flange 33 of the retainer ring 30. The flanges 33, 45 delimit a space for accommodating the sleeve 20.

A second connection member 50 that is provided to connect for example a second FC type optic connector carrying a second optic fiber (both not shown) is fit over and attached to the cylinder 40 by a pin 95 (also see FIGS. 6 and 7) whereby the second connection member 50 is axially movable in unison with the cylinder 40. In an alternate embodiment, the connection member 50 and the cylinder 40 may integrally formed with each other. Ends of the first and second fibers that are connected to the first and second connection members 12, 50 are received and retained in the sleeve 20 in an aligned but spaced fashion.

The cylinder 40 is externally threaded at 42. The second connection member 50 has inner threading 53 engages the threading 42 of the cylinder 40 for attaching the second connection member 50 to the cylinder 40. Aligned holes 52, 43 are respectively defined in the second connection member 50 and the cylinder 40 for receiving the pin 95 that secures the second connection member 50 to the cylinder 40, allowing both to be axially movable in unison with each other.

A manual knob ring 60 is fit over the cylinder 40. In the embodiment illustrated, the ring 60 has an inner flange 62 defining an inner-threaded bore 63 (see FIG. 9) fit over and engaging the threading 42 of the cylinder 40. A coupling ring 70 is fit over the cylinder 40. The coupling ring 70 has an inwardly extending tab 71 slidably received in an axially-extending grooves 41 defined in the cylinder 40 whereby the coupling ring 70 is axially movable along the groove 41 of the cylinder 40. The coupling ring 70 is received in the circular cavity 15 and has two outwardly extending tabs 72 snugly fit into the notches 151 thereby preventing the coupling ring 70 and the cylinder 40, as well as the second connection member 50, from rotation with respect to the base body 11 while allowing axial movement of the cylinder 40 and the second connection member 50 along the central axis 113 with respect to the base body 11 thus changing distance between the fibers.

A stop ring 80 is fit over the cylinder 40 adjacent the proximal end thereof. The stop ring 80 is an open ring having two separate ends each forming a rectangular tab 81 received in an cutout 44 defined in the proximal end of the cylinder 40 to be secured thereto. The stop ring 80 serves to limit the axial movement of the cylinder 40 and the second connection member 50 with respect to the base body 11 when the cylinder 40 is moving in a direction away from the base body 11. On the other hand, the second connection member 50 forms an outer flange 51 opposing the inner flange 62 of the knob 60. The outer flange 51 engages the inner flange 62, stopping the axial movement of the cylinder 40 and the second connection member 50 in a direction toward the base body 11. Thus, the cylinder 40 is capable to axially move between extreme positions defined by the stop ring 80 and the outer flange 51 of the second connection member 50.

The manual knob ring 60 has a circumferential flange 61 rotatably received in the recess 16 of the base body 11 and retained in the recess 16 by being partially overlapped by heads of the bolts 91, 92 whereby the rotation of the manual knob ring 60 induces a relative axial movement of the movable cylinder 40 and the second connection member 50 along the central axis 113 with respect to the base body 11 and the knob 60 and thus changing relative position of the ends of the optic fibers with respect to each other along the central axis to adjust attenuation of the optic signal passing through the optic adaptor 100. When a desired attenuation is achieved, the bolts 91, 92 are tightened and thus securing the knob 60 in position.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An optic device adapted to connect ends of two optic fibers in an aligned but spaced fashion and adapted to adjust attenuation of optic signal traveling between the optic fibers, the optic device comprising:

a stationary portion comprising:

a base body adapted to be secured to an external fixture and forming a first fiber connection member in a first surface thereof for connection with a first one of the two optic fibers, the base body defining a central bore extending through the first fiber connection member along a central axis, and a sleeve having a first end received in the central bore for receiving the end of the first optic fiber; and a movable portion comprising:

a cylinder having a proximal end received in the central bore along the central axis and receiving a second end of the sleeve whereby the cylinder is axially movable with respect to the base body along the central axis, the cylinder having an external threading;

second fiber connection member mounted to the cylinder to be axially movable therewith, the second fiber connection being adapted to connect a second one of the two optic fiber with the end of the second optic fiber received in the second end of the sleeve whereby the axial movement of the cylinder induces change of a space between ends of the optic fibers, and a knob ring having inner threading engaging the external threading of the cylinder, the knob being rotatably mounted to but being not axially movable with respect the base body whereby rotation of the knob induces axial movement of the cylinder and the second fiber connection member with respect to the base body and the first fiber connection member;

wherein the body has a second surface in which a cavity is defined, at least one notch being defined in the second surface and in communication with the cavity, a coupling ring being received in the cavity and forming an outwardly extending tab snugly received in the notch for rotatably fixing the coupling ring to the base body, the cylinder extending through die coupling ring and forming an axially-extending groove for movably receiving a tab inwardly extending from the coupling ring thereby preventing the cylinder from rotation with respect to the base body while allowing axial movement of the cylinder with respect to the base body;

wherein a stop ring is fit over and attached to the cylinder for limiting the axial movement of the cylinder with respect to the base body in a first direction along the central axis;

wherein the second fiber connection member forms a flange for engaging and thus limiting the axial movement of the cylinder with respect to the base body in a second direction along the central axis;

wherein the stationary portion further comprises a retainer ring received and retained in the central bore, the retainer ring receiving and retaining the first end of the sleeve;

wherein the retainer ring is externally threaded and wherein the central bore is inner-threaded for threadingly engage the threading of the retainer ring thus retaining the retainer ring in the central bore;

wherein notches are defined in an end of the retainer ring for engaging a tool to facilitate the engagement between the retainer ring and the central bore;

wherein the knob ring comprises a circular flange rotatably received in a circular recess defined in a second surface of the base body, the base body defining at least one bolt hole threadingly engaging a bolt having a head partially overlapping the flange of the knob ring for retaining the knob ring in the recess;

wherein the knob ring comprises a circular flange rotatably received in a circular recess defined in a second surface of the base body, the base body defining at least one bolt hole threadingly engaging a bolt having a head partially overlapping the flange of the knob ring, the bolt being selectively tightened to secure the knob ring in position;

wherein the second fiber connection member forms inner threading engaging the external treading of the cylinder, the second fiber connection member and the cylinder forming aligned holes for receiving a pin that fixes the second fiber connection member to the cylinder.

2. An optic system comprising:

first and second optic fibers, each having an end; and a connection device connecting the ends of the first and second optic fiber to each other along a central axis in an aligned but spaced manner, the connection device comprising:

a stationary portion comprising:

a base body adapted to be secured to an external fixture and forming a first fiber connection member in a first surface thereof to connect the first optic fiber, the base body defining a central bore extending through the first fiber connection member along the central axis, and a sleeve having a first end received in the central bore for receiving the end of the first fiber optic; and a movable portion comprising:

a cylinder having a proximal end received in the central bore along the central axis and receiving a second end of the sleeve whereby the cylinder is axially movable with respect to the base body along the central axis, the cylinder having an external threading;

a second fiber connection member mounted to the cylinder to be axially movable therewith, the second fiber connection connecting the second optic fiber and the end of the second optic fiber received in the second end of the sleeve whereby the axial movement of the cylinder induces change of a space between ends of the optic fibers, and a knob ring having inner threading engaging the external threading of the cylinder, the knob being rotatably mounted to but being not axially movable with respect the base body whereby rotation of the knob induces axial movement of the cylinder and the second fiber connection member with respect to the base body and the first fiber connection member;

wherein the base body has a second surface in which a cavity is defined, at least one notch being defined in the second surface and in communication with the cavity, a coupling ring being received in the cavity and forming an outwardly extending tab snugly received in the notch for rotatably fixing the coupling ring to the base body, the cylinder extending through the coupling ring and forming an axially-extending groove for movably receiving a tab inwardly extending from the coupling ring thereby preventing the cylinder from rotation with respect to the base body while allowing axial movement of the cylinder with respect to the base body;

wherein a stop ring is fit over and attached to the cylinder for limiting the axial movement of the cylinder with respect to the base body in a first direction along the central axis;

wherein the second fiber connection member forms a flange for engaging and thus limiting the axial movement of the cylinder with respect to the base body in a second direction along the central axis;

wherein the stationary portion further comprises a retainer ring received and retained in the central bore, the retainer ring receiving and retaining the first end of the sleeve;

wherein the retainer ring is externally threaded and wherein the central bore is inner-threaded for threadingly engage the threading of the retainer ring thus retaining the retaining ring in the central bore;

wherein notches are defined in an end of the retainer ring for engaging a tool to facilitate the engagement between the retainer ring and the central bore;

wherein the knob ring comprises a circular flange rotatably received in a circular recess defined in a second surface of the base body, the base body defining at least one bolt hole threadingly engaging a bolt having a head partially overlapping the flange of the knob ring for retaining the knob ring in the recess;

wherein the knob ring comprises a circular flange rotatably received in a circular recess defined in a second surface of the base body, the base body defining at least one bolt hole threadingly engaging a bolt having a head partially overlapping the flange of the knob ring, the bolt being selectively tightened to secure the knob ring in position;

wherein the second fiber connection member forms inner threading engaging the external threading of the cylinder, the second fiber connection member and the cylinder forming aligned holes for receiving a pin that fixes the second fiber connection member to the cylinder.

* * * * *